(12) United States Patent
Yoshino et al.

(10) Patent No.: US 9,712,729 B2
(45) Date of Patent: Jul. 18, 2017

(54) CAMERA COVER AND CAMERA

(71) Applicant: PANASONIC INTELLECTUAL PROPERTY MANAGEMENT CO., LTD., Osaka (JP)

(72) Inventors: Toyokazu Yoshino, Fukuoka (JP); Hideki Yasuda, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 76 days.

(21) Appl. No.: 14/865,496

(22) Filed: Sep. 25, 2015

(65) Prior Publication Data

US 2016/0088200 A1    Mar. 24, 2016

Related U.S. Application Data

(63) Continuation of application No. 13/683,233, filed on Nov. 21, 2012.

(30) Foreign Application Priority Data

Nov. 25, 2011  (JP) ................................ 2011-257695
Apr. 9, 2012   (JP) ................................ 2012-088709
Nov. 2, 2012   (JP) ................................ 2012-242604

(51) Int. Cl.
  *H04N 5/225*    (2006.01)
  *H04N 7/18*     (2006.01)
  (Continued)

(52) U.S. Cl.
  CPC ......... *H04N 5/2252* (2013.01); *G03B 11/043* (2013.01); *G03B 17/08* (2013.01); *G08B 13/19619* (2013.01); *H04N 7/18* (2013.01)

(58) Field of Classification Search
  CPC .. H04N 5/2252; H04N 7/18; G08B 13/19619; G03B 11/043; G03B 17/08
  See application file for complete search history.

(56) References Cited

U.S. PATENT DOCUMENTS 3,515,579 A  *  6/1970  Shepherd ................. B05D 7/26
                                                    106/13
3,635,756 A  *  1/1972  Shepherd ............... A01N 25/10
                                                    428/417

(Continued)

FOREIGN PATENT DOCUMENTS

JP    2000-131747    5/2000
JP    2001-101505    4/2001
(Continued)

OTHER PUBLICATIONS

Search Report issued by E.P.O. patent office in E.P.O. Patent Application No. 14174967.1, dated Dec. 22, 2014.
Search report from E.P.O., mail date is Jun. 13, 2013.

*Primary Examiner* — Nathan Van Sell
(74) *Attorney, Agent, or Firm* — Greenblum & Bernstein, P.L.C.

(57) ABSTRACT

A camera cover and camera capable of mitigating water drop and dirt adhesion and of ensuring image clarity are provided. A dome section (130) of the camera cover includes, on its outer surface (130*a*), a hydrophilic coating (131) made of an inorganic material whose main component is a silicon compound. The thickness of the hydrophilic coating (131) is 0.01 to 1 μm. Surface roughness Ra of the hydrophilic coating (131) is 0.06 μm or less.

18 Claims, 15 Drawing Sheets

(51) Int. Cl.
  *G03B 17/08* (2006.01)
  *G03B 11/04* (2006.01)
  *G08B 13/196* (2006.01)

(56) References Cited

U.S. PATENT DOCUMENTS

| | | | |
|---|---|---|---|
| 6,287,701 | B1 | 9/2001 | Oochi et al. |
| 6,716,513 | B1 | 4/2004 | Hasuo et al. |
| 2002/0140850 | A1* | 10/2002 | Toste ............... G08B 13/19632 348/375 |
| 2003/0053806 | A1* | 3/2003 | Schneider ........ G08B 13/19632 396/427 |
| 2003/0103160 | A1* | 6/2003 | Tatewaki ......... G08B 13/19619 348/375 |
| 2004/0263623 | A1* | 12/2004 | Arbuckle ......... G08B 13/19619 348/143 |
| 2005/0154112 | A1 | 7/2005 | Shigeru et al. |
| 2007/0126871 | A1* | 6/2007 | Henninger ....... G08B 13/19619 348/151 |
| 2007/0126872 | A1* | 6/2007 | Bolotine .......... G08B 13/19619 348/151 |
| 2007/0237206 | A1 | 10/2007 | Kubota et al. |
| 2008/0055409 | A1* | 3/2008 | Mars ..................... G03B 37/02 348/143 |
| 2008/0084474 | A1* | 4/2008 | Bergstrom ....... G08B 13/19619 348/143 |
| 2009/0176024 | A1 | 7/2009 | Shigeru et al. |
| 2010/0215928 | A1 | 8/2010 | Murayama et al. |
| 2010/0293994 | A1 | 11/2010 | Murayama et al. |
| 2011/0163254 | A1 | 7/2011 | Stark |

FOREIGN PATENT DOCUMENTS

| | | |
|---|---|---|
| JP | 2001-129474 | 5/2001 |
| JP | 2002-138156 | 5/2002 |
| JP | 2002-344786 | 11/2002 |
| JP | 2003-78788 | 3/2003 |
| JP | 2006-29956 | 2/2006 |
| JP | 2006-313312 | 11/2006 |
| JP | 2008-176207 | 7/2008 |
| JP | 2008-195856 | 8/2008 |
| JP | 2009-090641 | 4/2009 |
| WO | 03/080744 | 10/2003 |

* cited by examiner

NO HYDROPHILIC TREATMENT

WITH HYDROPHILIC TREATMENT

| HYDROPHILIC TREATMENT | DOME SURFACE CONTACT ANGLE (DEGREES) | IMAGE CLARITY |
|---|---|---|
| TREATMENT A | 5 | ○ |
| TREATMENT B | 25 | ○ |
| TREATMENT C | 30 | ○ |
| TREATMENT D | 34 | × |
| TREATMENT E | 50 | × |

FIG. 6

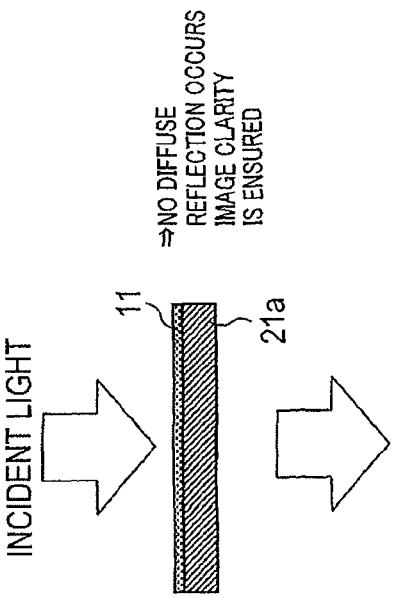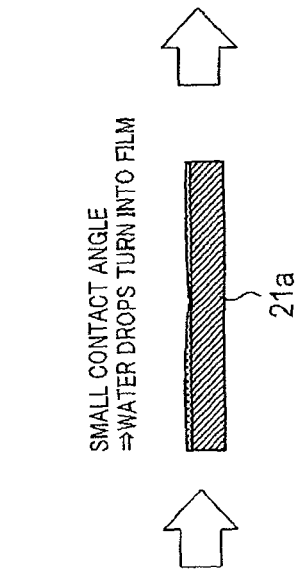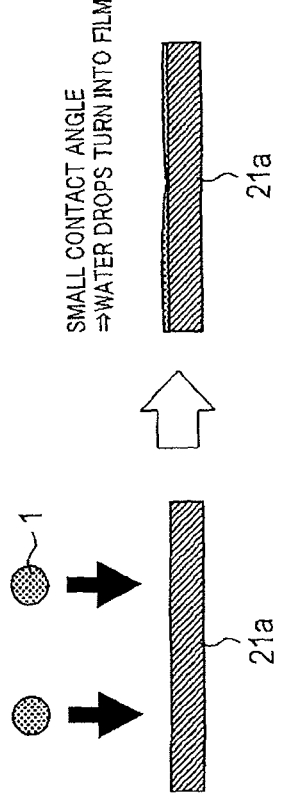

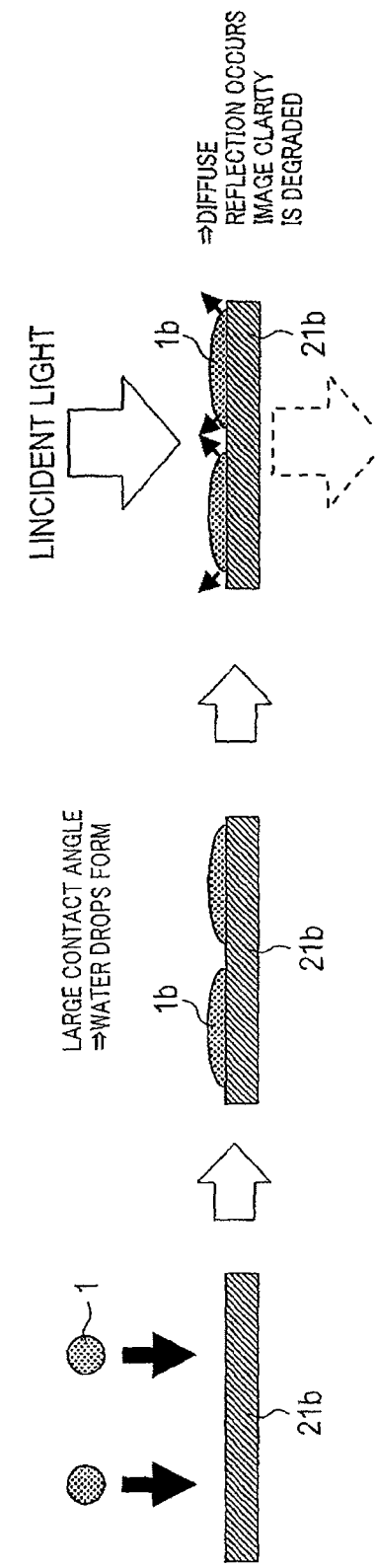

HYDROPHILIC COATING THICKNESS SPECIFICATIONS

| THICKNESS (μm) | THERMAL SHOCK TEST | TAPE PEEL TEST | LIGHT RESISTANCE TEST | OVERALL ASSESSMENT |
|---|---|---|---|---|
| 0.008 | ○ | × | × | × |
| 0.01 | ○ | ○ | ○ | ○ |
| 0.03 | ○ | ○ | ○ | ○ |
| 0.1 | ○ | ○ | ○ | ○ |
| 0.6 | ○ | ○ | ○ | ○ |
| 1.0 | ○ | ○ | ○ | ○ |
| 1.2 | × | ○ | ○ | × |

[TESTING METHOD]
・THERMAL SHOCK TEST: JIS C0025×100 CYCLES
・TAPE PEEL TEST: JIS K5400
・LIGHT RESISTANCE TEST: JIS B7754×1000 HOURS

[EVALUATION CRITERIA]
○: NO PEELING
×: PEELING OBSERVED

HYDROPHILIC COATING ROUGHNESS SPECIFICATIONS
(Ra=CENTER-LINE AVERAGE ROUGHNESS)

| Ra (μm) | TRANSMITTANCE (%) | ASSESSMENT |
|---|---|---|
| 0.01 | 94 | ○ |
| 0.03 | 93 | ○ |
| 0.05 | 92 | ○ |
| 0.06 | 90 | ○ |
| 0.07 | 89 | × |

[EVALUATION CRITERIA]
TRANSMITTANCE: NG UNACCEPTABLE IF LESS THAN 90 %

HYDROPHILIC COATING ROUGHNESS SPECIFICATIONS
(Rz=TEN-POINT AVERAGE ROUGHNESS)

| Rz (μm) | TRANSMITTANCE (%) | ASSESSMENT |
|---------|-------------------|------------|
| 0.005   | 98                | ○          |
| 0.01    | 94                | ○          |
| 0.04    | 93                | ○          |
| 0.08    | 91                | ○          |
| 0.10    | 90                | ○          |
| 0.13    | 88                | ×          |

[EVALUATION CRITERIA]
TRANSMITTANCE: NG UNACCEPTABLE IF LESS THAN 90 %

*FIG. 12*

HYDROPHILIC COATING
ROUGHNESS SPECIFICATIONS
(Ry=MAXIMUM HEIGHT)

| Ry (μm) | TRANSMITTANCE (%) | ASSESSMENT |
|---|---|---|
| 0.01 | 94 | ○ |
| 0.02 | 93 | ○ |
| 0.05 | 92 | ○ |
| 0.10 | 90 | ○ |
| 0.12 | 89 | × |

[EVALUATION CRITERIA]
TRANSMITTANCE: NG UNACCEPTABLE IF LESS THAN 90 %

FIG. 13

| HYDROPHILIC TREATMENT | DOME SURFACE CONTACT ANGLE (DEGREES) | IMAGE CLARITY |
|---|---|---|
| TREATMENT A | 1 | ○ |
| TREATMENT B | 5 | ○ |
| TREATMENT C | 10 | ○ |
| TREATMENT D | 20 | × |
| TREATMENT E | 40 | × |

WATER CONTACT ANGLE = 10 DEGREES     WATER CONTACT ANGLE = 20 DEGREES

CAMERA COVER AND CAMERA

CROSS REFERENCE TO RELATED APPLICATIONS

The present application is a continuation application of pending U.S. application Ser. No. 13/683,233, filed on Nov. 21, 2012, which claims priority to Japanese Application No. 2012-242604 filed on Nov. 2, 2012, No. 2012-088709 filed on Apr. 9, 2012, and No. 2011-257695 filed on Nov. 25, 2011. The disclosure of U.S. application Ser. No. 13/683,233 is incorporated by reference herein in its entirety.

TECHNICAL FIELD

The claimed invention relates to camera covers and cameras, and to an improvement for covers of surveillance cameras installed outdoors, for example.

BACKGROUND ART

Surveillance cameras are used widely as security systems for residences and commercial buildings, or as outdoor security systems. Surveillance cameras include a camera body, such as a CCD camera and/or the like, and an attachment base that enables attachment of the camera body to a camera installation surface, such as a wall, a ceiling, and/or the like.

A transparent protective cover is provided on an opening in the camera body for protection from rain, gravel, and/or the like. Not only light transmittance, but impact resistance and scratch resistance are also demanded of the protective cover. Among other things, water-repellent functionality for preventing, for example, mud water from adhering to the outer surface, and moisture transmission preventive functionality for preventing condensation on the inner surface in the event of a sudden change in temperature are also demanded of the protective cover.

Resin materials are used for the base material of the protective cover mainly for product cost purposes. In addition, readily moldable resin materials, such as polycarbonate, acryl, and/or the like, are used as base materials to obtain protective covers of diverse shapes. Resin base materials are highly moldable, and they can be molded into various shapes, such as hemispherical (dome-shaped), semicylindrical, box-shaped, and/or the like.

Surveillance cameras are often installed outdoors, and are thus found in environments where the lens is prone to contact with water drops. When a water drop adheres to the lens, the water drop causes light to refract, and consequently, the obtained image is severely and adversely affected.

In recent years, a technique where a hydrophilic coating including a photocatalyst is applied to the camera cover surface has been receiving considerable attention as a method of addressing the above. With this technique, the functionality of the hydrophilic coating that turns water drops into a thin film of water serves to minimize the impact of water drops on the obtained image. Furthermore, even if dirt were to adhere, this film of water would suspend the dirt from the cover surface, and one would be able expect a cleaning effect where the suspended dirt is automatically removed by rain, for example.

Japanese Patent Application Laid-Open No. 2003-78788 (hereinafter referred to as Patent Literature 1) discloses an outdoor television camera having a photocatalyst film formed on the camera cover surface. The camera cover disclosed in Patent Literature 1 is configured in such a manner that its surface is coated with a hydrophilic photocatalyst film, and dirt is cleaned by rain.

SUMMARY OF INVENTION

Technical Problem

The above-mentioned photocatalyst film exhibits hydrophilicity when it is exposed to ultraviolet rays contained in sunlight, whereby titanium dioxide, which is photoactive, is excited. Thus, with related art, there is a disadvantage in that during night time or on rainy days, or when installed under eaves or trees, in which case there will be no exposure to sunlight, sufficient hydrophilicity cannot be achieved. In addition, with respect to the photocatalyst film, since titanium dioxide ($TiO_2$) corrodes the surrounding resin, there is a risk of dirtying the camera cover and degrading the obtained image.

An object of the claimed invention is to provide a camera cover and camera in which a hydrophilic coating that ensures light transmittance is applied and images are made clear, the camera cover and camera further being capable of preventing water drops and dirt from adhering, thereby ensuring clarity of image.

Solution to Problem

A camera cover of the claimed invention includes a camera cover including a resin base material that covers a camera section. The outer surface of the resin base material includes a hydrophilic coating made of an inorganic material whose main component is a silicon compound. The surface of the hydrophilic coating has a water contact angle of or greater than 5 degrees but less than 34 degrees. The thickness of the hydrophilic coating is 0.01 to 1 µm. Center-line average roughness Ra of the surface of the hydrophilic coating is 0.06 µm or less.

In addition, a camera cover of the claimed invention includes a camera cover including a resin base material that covers a camera section. The outer surface of the resin base material includes a hydrophilic coating made of an inorganic material whose main component is a silicon compound. The surface of the hydrophilic coating has a water contact angle of or greater than 5 degrees but less than 34 degrees. The thickness of the hydrophilic coating is 0.01 to 1 µm. Maximum height Ry and ten-point average roughness Rz of the surface of the hydrophilic coating is 0.10 µm or less.

Furthermore, a silicon compound of the claimed invention is silicone-based or glass-based.

A camera of the claimed invention is configured to include the above-mentioned camera cover.

The surveillance camera can include a housing having a generally cylindrical portion extending from the base member and a transition portion extending from an end of the housing opposite the base member, the transition portion being secured to the cover.

The transition portion can have a tapered configuration.

A plurality of depressions can be provided in the transition portion, each of the plurality of depressions being configured to receive a fastening member therein.

Each of the plurality of depressions can be defined by a surface sloping inwardly from an outer surface of the transition portion.

The transition portion can have a tapered configuration, a taper of the transition portion being less than the inwardly slope of each of the plurality of depression.

Each of the plurality of depressions can be positioned adjacent a boundary between the transition portion and the cylindrical portion.

Advantageous Effects of Invention

According to the claimed invention, a hydrophilic coating that ensures light transmittance is applied and images are made clear, the claimed invention further being capable of permanently preventing water drops and dirt from adhering, thereby ensuring clarity of image.

BRIEF DESCRIPTION OF DRAWINGS

FIG. 6 shows a table representing the relationship between dome surface contact angle and image clarity per hydrophilic treatment with respect to the camera cover according to Embodiment 1 of the claimed invention;

FIGS. 8A, 8B and 8C are schematic views illustrating dome surface contact angle and image clarity for a case where the contact angle of the camera cover according to Embodiment 1 of the claimed invention is small;

FIGS. 9A, 9B and 9C are schematic views illustrating dome surface contact angle and image clarity for a case where the contact angle of the camera cover according to Embodiment 1 of the claimed invention is large;

FIG. 10 shows results of various tests performed on hydrophilic coatings for the camera cover according to Embodiment 1 of the claimed invention with respect to thickness and durability;

FIG. 11 shows the relationship between surface roughness (center-line average roughness Ra) and transmittance with respect to hydrophilic coatings for the camera cover according to Embodiment 1 of the claimed invention;

FIG. 12 shows the relationship between ten-point average roughness Rz and transmittance with respect to hydrophilic coatings for the camera cover according to Embodiment 1 of the claimed invention;

FIG. 13 shows the relationship between maximum height Ry and transmittance with respect to hydrophilic coatings for the camera cover according to Embodiment 1 of the claimed invention;

DESCRIPTION OF EMBODIMENTS

Embodiments of the claimed invention are described in detail below with reference to the drawings.

Embodiment 1

Figure 1:
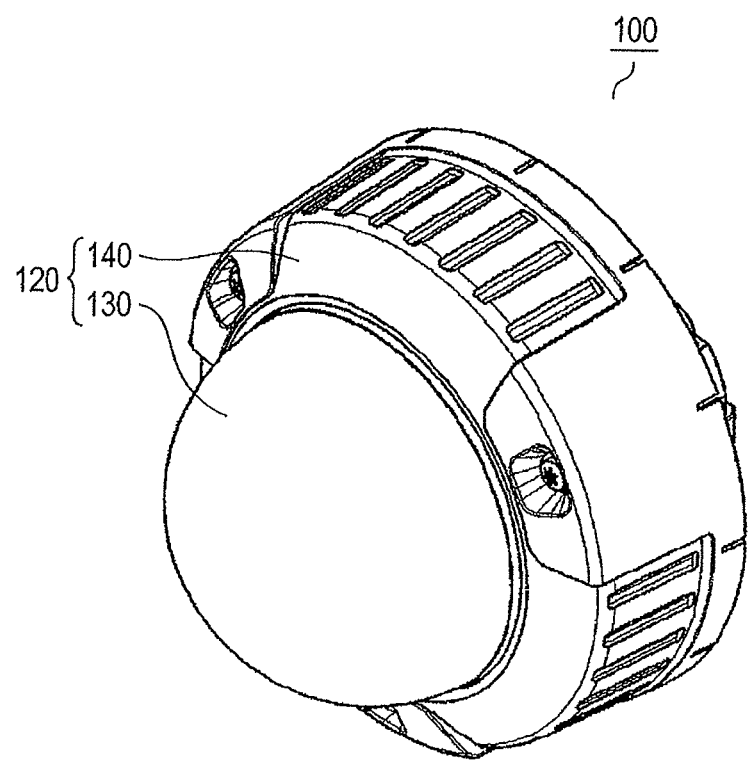
FIG. 1 is a perspective view of a surveillance camera including a camera cover according to Embodiment 1 of the claimed invention.
Figure 2:
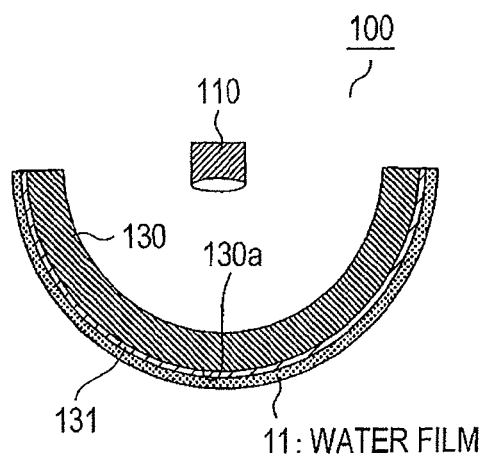
FIGS. 2A and 2B are sectional views of a key portion of a dome section of the camera cover according to Embodiment 1 of the claimed invention.
Figure 2:
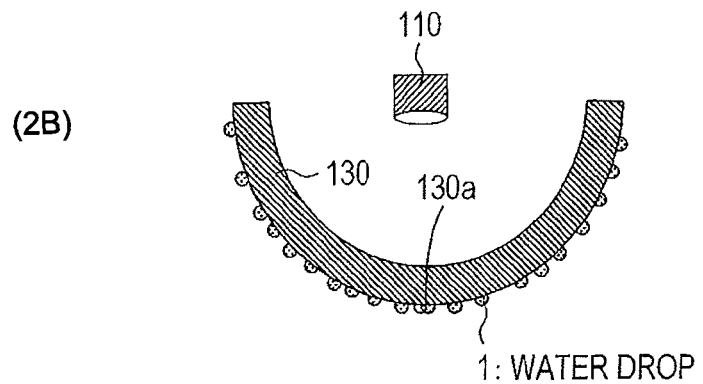

FIG. 1 is a perspective view of a surveillance camera including a camera cover according to an embodiment of the claimed invention. FIGS. 2A and 2B are sectional views of a key portion of a dome section of the camera cover in FIG. 1. FIG. 2A shows a case where the dome section is hydrophilically treated, and FIG. 2B shows a case where the dome section is not hydrophilically treated.

This embodiment is an application example involving a camera cover for a surveillance camera used in, for example, surveillance systems for facilities and buildings.

As shown in FIG. 1 and FIGS. 2A and 2B, surveillance camera 100 includes camera section 110 (see FIGS. 2A and 2B), and camera cover 120, which houses and covers camera section 110, thus protecting camera section 110.

Camera section 110 is an imaging section including, for example, a charge coupled device (CCD) camera.

Camera cover 120 is a lens cover that covers a lens of camera section 110. In this embodiment, camera cover 120 covers the whole of camera section 110, and forms a main body housing of surveillance camera 100. Camera cover 120 includes dome section 130 and camera body 140. Dome section 130 covers the entire imaging surface of camera section 110. Camera body 140 supports and secures a circular opening of dome section 130.

Dome section 130 covers the entire imaging area of camera section 110 (see FIGS. 2A and 2B) housed in camera body 140. Because dome section 130 is dome-shaped, it has a broad field of view and is capable of significantly expanding the imaging range of camera section 110.

For dome section 130, a resin material with favorable moldability and transparency is used as a base material. The above-mentioned resin material includes organic resin materials and inorganic resin materials. In this embodiment, an organic resin material, such as polycarbonate and/or the like, is used for the base material of dome section 130. Polycarbonate is suitable because it is hard and resistant to impact. In addition, a resin with favorable transparency, such as acryl and/or the like, may also be used.

As shown in FIG. 2A, a hydrophilic treatment is performed on outer surface 130a of dome section 130 to form hydrophilic coating (i.e., hydrophilically treated layer) 131. Once hydrophilic coating 131 is formed, water drops that land on outer surface 130a do not become bead-shaped, and instead spread thinly across hydrophilic coating 131 and turn into a film, thus forming water film 11. In addition, as shown in FIG. 2B, without hydrophilic treatment, water drops that land on outer surface 130a become bead-shaped water drops 1. In this embodiment, a hydrophilic treatment is performed on outer surface 130a of dome section 130. Details are discussed hereinafter.

Camera body 140 is formed of a resin material, a metal, and/or the like. Camera body 140 is formed in a cylindrical shape with a slightly tapered tip. The circular opening of dome section 130 is secured to an opening in the cylindrical shape in a water-tight manner. In addition, to a rear-end side opening of camera body 140 is attached a metal base member (not shown) for securing surveillance camera 100 to a camera installation surface, such as a wall, a ceiling, and/or the like.

Because dome section 130 is of a resin base material, camera cover 120 is highly moldable, and camera covers of, in addition to the above-mentioned dome-shape, semicylindrical shapes or irregular shapes may be produced with ease. In addition, dome section 130 and camera body 140 may be formed in one piece with a resin material.

[Hydrophilic Coating 131 of Dome Section 130]

As shown in FIG. 2A, for camera cover 120, a hydrophilic treatment is performed on outer surface 130*a* of dome section 130 to form hydrophilic coating (i.e., hydrophilically treated layer) 131.

Hydrophilic coating 131 is so adapted that its water contact angle (hereinafter referred to as contact angle) is less than 34 degrees. In particular, it is preferable that the contact angle on hydrophilic coating 131 be equal to or greater than 5 degrees but less than 34 degrees. When the contact angle on hydrophilic coating 131 is 34 degrees or greater, the advantages of hydrophilic treatment of the claimed invention cannot be obtained. In addition, when the contact angle on hydrophilic coating 131 is less than 5 degrees, the energy of hydrophilic coating 131 becomes too high, which causes an attractive force with respect to hydrophilic coating 131 itself to act not only on water drops, but also on dirt, as a result of which dirt becomes prone to accumulating. Consequently, the performance of hydrophilic coating 131 is severely compromised. In addition, it has also been discovered that, due to the effects of dirt, the contact angle becomes equal to or greater than 34 degrees. A further discussion regarding contact angle will hereinafter be provided with reference to FIGS. 5A through 5E and FIG. 6.

A hydrophilic treatment for a camera cover configured in the manner discussed above is described below.

First, the basic idea behind hydrophilic coatings for surveillance cameras will be described.

[Water-Drop-Less Mechanism]

Figure 3:
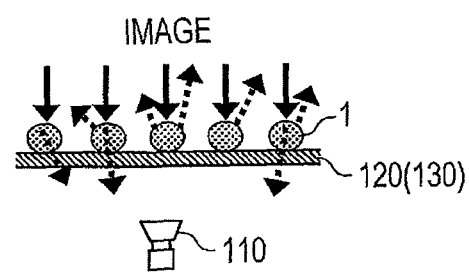
FIGS. 3A and 3B are views illustrating a water-drop-less mechanism of the camera cover according to Embodiment 1 of the claimed invention.
Figure 3:
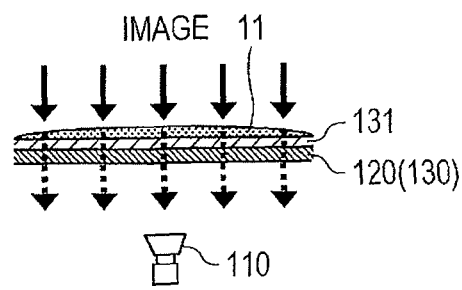

FIGS. 3A and 3B are views illustrating a water-drop-less mechanism of this embodiment. A structure in which a hydrophilic treatment has been performed on camera cover 120 and which is capable of ensuring visibility by means of hydrophilic coating 131 even when water drops are present is herein referred to as being "water-drop-less." FIG. 3A is a schematic view of water drops on a camera cover and the obtained image with respect to a case where no hydrophilic treatment is performed. FIG. 3B is a schematic view of water drops on a camera cover and the obtained image with respect to a case where a hydrophilic treatment is performed.

As shown in FIG. 3A, camera cover 120 covers the imaging surface side of camera section 110. For purposes of convenience, camera cover 120 on the imaging surface side of camera section 110 is shown as being flat. However, the same would apply for dome section 130 of camera cover 120.

In the case of a surveillance camera installed outdoors, water drops 1 would land on camera cover 120 on a rainy day. If no hydrophilic treatment has been performed on camera cover 120, water drops 1 on camera cover 120 would remain on camera cover 120. As water drops 1 adhere to camera cover 120, light is diffusely reflected due to water drops 1 as indicated with the broken line arrows in FIG. 3A. The obtained image is severely and adversely affected as a result. According to experiments by the present inventors, it has been confirmed that when camera cover 120 is configured with an organic resin material, such as polycarbonate and/or the like, water drops always adhere to camera cover 120 regardless of the manner in which the water drops are placed, and light is refracted by water drops 1. In addition, although omitted in the drawings, it has also been confirmed that when a water-repellent coating is applied to the lens cover, the water drops are prone to becoming bead-shaped due to the water-repellent coating, and light is diffusely reflected even more. In addition, in the case of a surveillance camera installed outdoors, unlike an on-board camera mounted on a vehicle, one cannot expect an effect where water drops are blown off by the wind pressure, vibration, and/or the like experienced while the vehicle is traveling. Thus, the adhesion of water drops 1 to camera cover 120 leads directly to a drop in image visibility (see FIG. 7 discussed hereinafter).

In this embodiment, by performing a hydrophilic treatment on camera cover 120, water-drop-less is achieved, and visibility is ensured.

As shown in FIG. 3B, a hydrophilic treatment is performed on camera cover 120 to form hydrophilic coating 131. Once hydrophilic coating 131 is formed by performing a hydrophilic treatment on camera cover 120, water drops that land on camera cover 120 do not become bead-shaped, and instead spread thinly across hydrophilic coating 131 to turn into a film, thus forming water film 11. In other words, water drops landing on camera cover 120 do not become bead-shaped because of the hydrophilic treatment, and instead become water film 11 spread generally evenly across hydrophilic coating 131. As hereinafter discussed, hydrophilic coating 131 cannot be just any coating, and, as discovered by the present inventors, it is necessary for it to have a certain contact angle. This enables camera section 110 to handle water drops in such a manner as to allow favorable images to be obtained. The contact angle is determined by the material of hydrophilic coating 131. In addition to the above-mentioned contact angle, it is also necessary that hydrophilic coating 131 be durable.

In this embodiment, water drops landing on camera cover 120 form a film on hydrophilic coating 131 to become water film 11 of a generally even thickness. Thus, as indicated with the broken line arrows in FIG. 3B, light enters camera section 110 almost without being refracted at all, thereby ensuring favorable image visibility (see FIG. 7 discussed hereinafter). According to experiments by the present inventors, for example, by including hydrophilic coating 131 having a certain contact angle, camera cover 120 produced favorable results where, even when water drops landed on camera cover 120, they were generally of no consequence. In particular, unlike the case in FIG. 3A where no hydrophilic treatment is performed, no diffuse reflection of light caused by bead-shaped water drops 1 occurred at all.

[Dirt-Resistance Mechanism]

By performing a hydrophilic treatment on camera cover 120, it became possible to ensure visibility by means of a water-drop-less structure. In addition to this effect, dirt-resistance effects are further provided.

Figure 4:
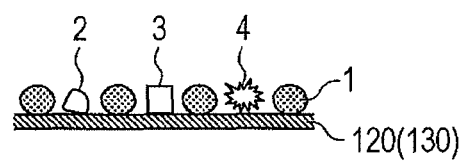
FIGS. 4A and 4B are views illustrating a dirt-resistance mechanism of the camera cover according to Embodiment 1 of the claimed invention.
Figure 4:
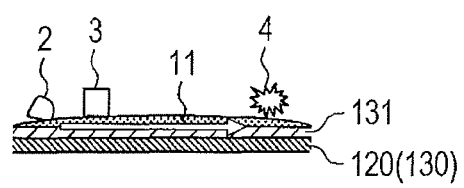
Figure 5:
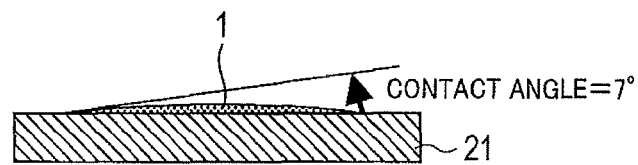
FIGS. 5A, 5B, 5C, 5D and 5E are views illustrating contact angles of the camera cover according to Embodiment 1 of the claimed invention.
Figure 5:
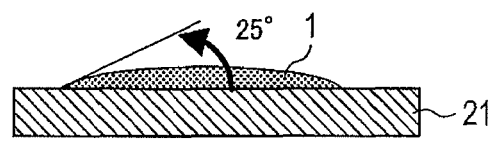
Figure 5:
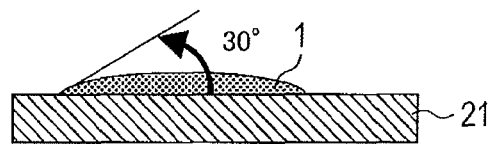
Figure 5:
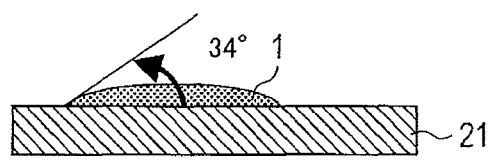
Figure 5:
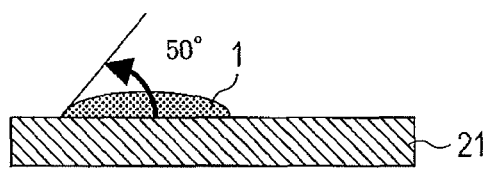

FIGS. 4A and 4B are views illustrating a dirt-resistance mechanism of this embodiment. FIG. 4A is a schematic view of water drops and dirt on a lens cover for a case where no hydrophilic treatment has been performed. FIG. 4B is a schematic view of water drops and dirt on a lens cover for a case where a hydrophilic treatment has been performed.

In the case of a surveillance camera installed outdoors, various kinds of dirt 2-4 adhere to camera cover 120. Dirt 2-4 generally include various kinds of dust. Dirt 2-4 significantly degrade the imaging screen of camera section 110. In addition, when the surface of camera cover 120 is wet, that is, when there are fine water drops on camera cover 120, the adhesion of dirt 2-4 is facilitated.

As shown in FIG. 4A, when no hydrophilic treatment is performed on camera cover 120, dirt 2-4 adhere along with water drops 1. As dirt 2-4 adhere to camera cover 120, they significantly degrade the brightness and resolution of camera section 110. In addition, for example, if dirt 3 is a grain of sand and/or the like having a reflective surface as if cleaved along a crystal plane, light may sometimes be diffusely reflected to a significant extent at this reflective surface. In addition, as discussed above, water drops 1 themselves diffusely reflect light.

As shown in FIG. 4B, a hydrophilic treatment is performed on camera cover 120 to form hydrophilic coating 131. Water drops landing on camera cover 120 form a film on hydrophilic coating 131 to become water film 11 of a generally even thickness. Because the material of camera cover 120 has greater affinity for the water drops turned into a film than it does for dirt 2-4, as the water drops form a film, water film 11 slips itself in on the camera cover 120-side as indicated with the arrow in FIG. 4B. Thus, water film 11 on hydrophilic coating 131 suspends dirt 2-4, making it possible to clean dirt 2-4 on (i.e., to self-clean) the surface of camera cover 120.

Next, the contact angle of camera cover 120 will be discussed in detail.

FIGS. 5A through 5E are views illustrating contact angle. FIG. 6 shows a table representing the relationship between dome surface contact angle (FIGS. 5A through 5E) and image clarity per hydrophilic treatment. The dome contact angles in the table shown in FIG. 6 were measured with water. As for image clarity, water was sprayed onto the dome surface and the image was evaluated. In FIG. 6, the circles represent evaluations where water drops were not recognized within the image and image clarity was favorable, and the crosses represent evaluations where water drops were recognized within the image and image clarity was poor.

As shown in FIGS. 5A through 5E, contact angle is determined by the material of base material 21. In general, a contact angle of 40 degrees or less is referred to as hydrophilic, and a contact angle of 90 degrees or greater is sometimes referred to as water-repellent.

In this embodiment, an organic resin material, such as polycarbonate and/or the like, is used for the base material of dome section 130 of camera cover 120. In addition, a predetermined hydrophilic treatment is performed on outer surface 130a (hereinafter referred to as dome surface) of dome section 130 to form hydrophilic coating 131.

As shown in FIG. 6, the dome surface contact angle (in degrees) may be varied through the hydrophilic treatment performed on the dome surface. In addition, the present inventors have discovered that image clarity is dependent on dome surface contact angle. Specifically, when hydrophilic treatment A is performed, the dome surface contact angle is 5 degrees, and image clarity is favorable. In addition, when hydrophilic treatment B is performed, the dome surface contact angle is 25 degrees, and image clarity is favorable. When hydrophilic treatment C is performed, the dome surface contact angle is 30 degrees, and image clarity is favorable. In addition, when hydrophilic treatment D is performed, the dome surface contact angle is 34 degrees, and image clarity is poor. When hydrophilic treatment E is performed, the dome surface contact angle is 50 degrees, and image clarity is poor. Accordingly, from the perspective of image clarity, hydrophilic treatments A-C are performed to achieve a dome surface contact angle of or greater than 5 degrees but less than 34 degrees.

In addition, the present inventors have also discovered that when the dome surface contact angle is less than 5 degrees, dirt is prone to accumulate, and the performance of hydrophilic coating 131 is severely compromised. In other words, when the dome surface contact angle is less than 5 degrees, it is speculated that dirt is prone to accumulate as a result of the energy of hydrophilic coating 131 being too high, and an attractive force with respect to hydrophilic coating 131 itself acting on not only water drops but dirt as well. In addition, it was discovered that the contact angle becomes equal to or greater than 34 degrees due to effects of dirt.

Figure 7:
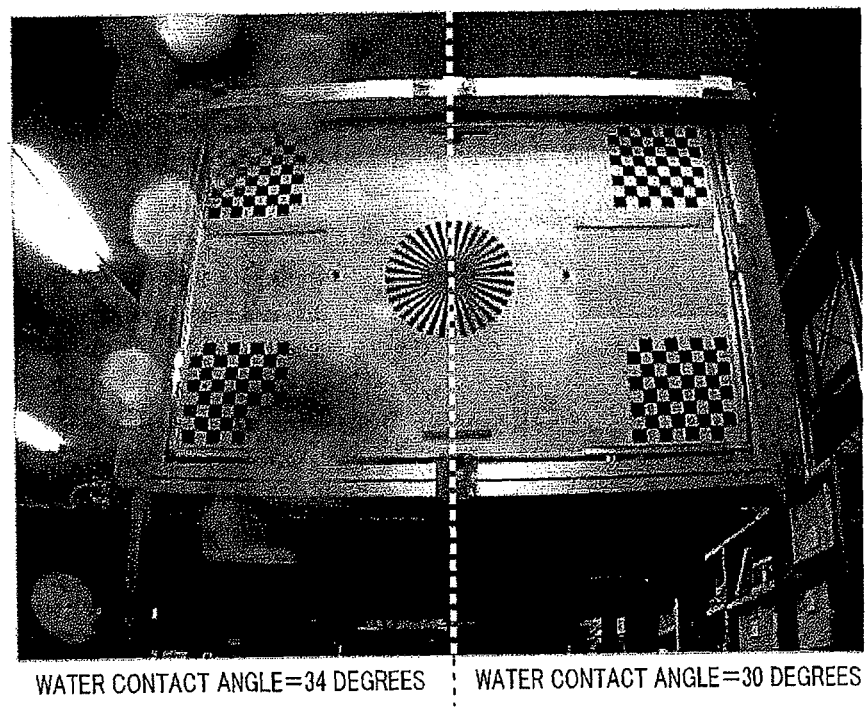
FIG. 7 is a diagram comparing the visibility of images by a surveillance camera including the camera cover according to Embodiment 1 of the claimed invention.

FIG. 7 is a diagram comparing the visibility of surveillance camera images. FIG. 7 shows actual images of different dome surface contact angles. On the left side of the broken line in FIG. 7 is shown an actual image where the contact angle is 34 degrees. On the right side of the broken line in FIG. 7 is shown an actual image where the contact angle is 30 degrees.

As shown on the right side of the broken line in FIG. 7, when the contact angle is 30 degrees, the image is so clear that no water drops are recognizable at all within the image. On the other hand, as shown on the left side of the broken line in FIG. 7, when the contact angle is 34 degrees, water drops are recognized within the image, and a proper image is not obtained due to diffuse reflection by the water drops and varying refractive indices. As the dome surface contact angle becomes equal to or greater than 34 degrees, image clarity worsens. Image clarity may be ensured by having the dome surface contact angle be less than 34 degrees.

Next, dome surface contact angle and image clarity will be discussed.

FIGS. 8A, 8B and 8C are schematic views illustrating dome surface contact angle and image clarity with respect to a case of a small contact angle. FIGS. 9A, 9B and 9C are schematic views illustrating dome surface contact angle and image clarity with respect to a case of a large contact angle.

As shown in FIG. 8A, in the case of a small contact angle, when water drops 1, such as rain drops and/or the like, fall onto the base material (base material 21a of a small contact angle), water drops 1 turn into a film (see FIG. 8B). As shown in FIG. 8C, as the water drops turn into a film, water film 11 of a generally even thickness is formed. Water film 11 is so formed on base material 21a as to be uniformly spread with a generally even thickness. Thus, incident light is not diffusely reflected by water film 11, allowing image clarity to be ensured.

On the other hand, as shown in FIG. 9A, in the case of a large contact angle, when water drops 1, such as rain drops and/or the like, fall onto the base material (base material 21b having a large contact angle), bead-shaped water drops 1b form (see FIG. 9B). As indicated with the arrows in FIG. 9C, incident light is diffusely reflected by bead-shaped water drops 1b, thereby degrading image clarity.

Next, a hydrophilic treatment for camera cover 120 will be described in detail.

(1) Regarding Hydrophilic Treatment

A hydrophilic material is applied to the outer surface (particularly outer surface 130a of dome section 130) of camera cover 120 made of an organic resin.

The main component of the material is a silicon compound. Silicon compounds, such as glass, are extremely durable and hard inorganic materials, and are also favorable in terms of light transmittance. Furthermore, silicon compounds exhibit hydrophilicity even in the absence of a photocatalyst including titanium dioxide. Therefore, silicon compounds provide permanent hydrophilic effects regardless of sunlight conditions. In this embodiment, a silicone material, which is a silicon compound, is used.

Next, its thickness is 0.01 to 1 μm. Coating solutions of inorganic materials are generally runny, and tend to form thinner films compared to organic materials. Furthermore, because inorganic coatings have thermal expansion coefficients that differ from that of camera cover 120, when applied in a thickness greater than 1 μm, they peel off readily in the event of a sudden change in temperature. In addition, when the thickness is less than 0.01 μm, the film itself lacks strength and peels off readily with just a slight external force. In particular, when installed outdoors, as a result of being subjected to the effects of ultraviolet rays, peeling may occur readily. In addition, uniformity of thickness is also important. A non-uniform thickness has a disadvantage in that the camera image becomes distorted.

FIG. 10 shows results of various tests performed with regard to hydrophilic coating thickness and durability. As shown in FIG. 10, thermal shock tests (JIS C0025, 100 cycles) resulted in no film peeling for thicknesses of 0.008 to 1.0 μm, but film peeling occurred for a thickness of 1.2 μm. In addition, during tape peel tests (JIS K5400), although no film peeling occurred for thicknesses of 0.01 to 1.2 μm, film peeling occurred for a thickness of 0.008 μm. Furthermore, during light resistance tests (JIS B7754, 1000 hours), although no film peeling occurred for thicknesses of 0.01 to 1.2 μm, film peeling occurred for a thickness of 0.008 μm.

The following method may be employed to extend durability. Specifically, in order to improve adhesion strength with respect to camera cover 120 (particularly dome section 130) made of an organic resin, an organic glue (i.e., adhesive) is incorporated. Specifically, in the case of an acrylic resin, 10 to 50% of an adhesive is incorporated.

In addition, in order to ensure light transmittance, with respect to the tolerable range of roughness for hydrophilic coating 131, center-line average roughness (surface roughness) Ra is made to be 0.06 μm or less. Center-line average roughness (surface roughness) is obtained by folding a roughness curve about a centerline, dividing the area formed between the roughness curve and the centerline by length L, and expressing the obtained value in micrometers (μm). It has been confirmed that when surface roughness Ra does not fall within this tolerable range, diffuse reflection of light takes place. In addition, for making hydrophilic coating 131 flat, it is effective to slow down the drying rate of hydrophilic coating 131.

FIG. 11 shows the relationship between surface roughness (center-line average roughness Ra) and transmittance with respect to hydrophilic coatings. As shown in FIG. 11, when center-line average roughness Ra is 0.06 μm or less, transmittance is 90% or greater. However, when center-line average roughness Ra is 0.07 μm or greater, surface irregularities cause transmittance to drop to 89%, thereby degrading the image.

In addition, in order to ensure light transmittance, with respect to the tolerable range of roughness for hydrophilic coating 131, ten-point average roughness Rz is made to be 0.10 μm or less. Ten-point average roughness Rz is obtained by calculating the difference between, with respect to a portion of a reference length sampled from a profile curve, the average value of heights from the highest peak to the fifth peak and the average value of heights from the deepest valley to the fifth valley, and expressing the difference in micrometers (μm).

FIG. 12 shows the relationship between ten-point average roughness Rz and transmittance with respect to hydrophilic coatings.

As shown in FIG. 12, when ten-point average roughness Rz is 0.10 μm or less, transmittance is 90% or greater. However, when ten-point average roughness Rz is 0.13 μm or greater, surface irregularities cause transmittance to drop to 88%, thereby degrading the image.

In addition, in order to ensure light transmittance, with respect to the tolerable range of roughness for hydrophilic coating 131, maximum height Ry is made to be 0.10 μm or less. Maximum height Ry is obtained by finding, with respect to a portion of reference length L sampled from a profile curve, the maximum height, and expressing it in micrometers (μm).

FIG. 13 shows the relationship between maximum height Ry and transmittance with respect to hydrophilic coatings.

As shown in FIG. 13, when maximum height Ry is 0.1 μm or less, transmittance is 90% or greater. However, when maximum height Ry is 0.12 μm or greater, surface irregularities cause transmittance to drop to 89%, thereby degrading the image.

(2) Regarding Contact Angle

Contact angle is basically determined solely by the material of hydrophilic coating 131. However, contact angle varies due to surface exposure and/or the like of camera cover 120 as a result of chemical changes, changes in roughness, dirt, and the formation of scratches to/of/on the surface resulting from degradation and/or the like caused by ultraviolet rays.

According to experiments and/or the like by the present inventors, in the case of contact angles within 20 degrees, it was confirmed that water drops turned into a film completely from around 20 degrees, and that, at around 30 degrees, while still being water drops, they were negligible for purposes of imaging. In addition, it was confirmed that at a contact angle of around 5 degrees, even fine water particles, such as vapor and/or the like, could also be turned into a film sufficiently.

(3) Regarding Camera Cover 120

Camera cover 120 is dome-shaped or hemispherical. In addition, it may also be of a flat shape, and may be used for a camera housing for housing the camera body. Materials for camera cover 120 generally include resins with favorable transparency, such as organic resins, acryl, and/or the like. In this embodiment, as an organic resin, polycarbonate, which is hard and resistant to impact, is used.

(4) Regarding Dirt Resistance

By having a hydrophilic treatment performed on outer surface 130a of dome section 130, this embodiment has water-drop-less effects where water drops are turned into a film, water drops are prevented from appearing in the obtained image, and diffuse reflection of light by water drops is prevented.

In addition to the water-drop-less effects mentioned above, it also has the following dirt resistance effects. Specifically, since camera cover 120 has greater affinity for water drops turned into a film than it does for dirt, as the water drops turn into a film, they slip themselves in on the camera cover 120-side. Thus, hydrophilic coating 131 suspends dirt, thereby allowing dirt to be removed along with water drops.

(5) Treatment Method for Hydrophilic Coating 131

The outer side of camera cover 120 (particularly, outer surface 130a of dome section 130) is coated through spraying or dipping, and is thereafter dried. The above-mentioned coating method need not be any special processing method, and common methods may be used.

(6) Miscellaneous

The distance between camera section 110 (see FIGS. 2A and 2B) and camera cover 120 is unrelated to the range of contact angles mentioned above. In other words, regardless of the distance between camera section 110 and camera cover 120, it is preferable that the contact angle be equal to or greater than 5 degrees but less than 34 degrees. In addition, regardless of whether camera cover 120 is dome-shaped or of a flat shape, it is preferable that the contact angle be equal to or greater than 5 degrees but less than 34 degrees.

As described in detail above, camera cover 120 in this embodiment includes dome section 130 and camera body 140. Dome section 130 covers the entire imaging surface of camera section 110. Camera body 140 supports and secures the circular opening of dome section 130. On outer surface 130a, dome section 130 has hydrophilic coating 131 made of an inorganic material whose main component is a silicon compound. The surface of hydrophilic coating 131 has a water contact angle of 5 degrees or greater but less than 34 degrees. The thickness of hydrophilic coating 131 is 0.01 to 1 μm. Surface roughness Ra of hydrophilic coating 131 is 0.06 μm or less.

There is provided a camera cover and camera capable of, through the above-mentioned water-drop-less mechanism, preventing water drops from adhering even as they land on camera cover 120, thereby ensuring image clarity.

In addition, through the above-mentioned dirt resistance mechanism, as water drops form a film, water film 11 on hydrophilic coating 131 suspends dirt 2-4, thereby allowing dirt 2-4 on the surface of camera cover 120 to be cleaned.

Thus, with camera cover 120, water drops and dirt may be prevented with the image made clear, and image clarity may be ensured. By way of example, if used for a cover of a surveillance camera installed outdoors, water drops, such as rain and/or the like, may be prevented from appearing in the obtained image, and diffuse reflection of light by water drops may be prevented. In addition, dirt may be self-cleaned, and dirt may thus be prevented from appearing in the obtained image.

Embodiment 2

In Embodiment 1, descriptions were provided with respect to camera cover 120 capable of resisting water drops and dirt, and of ensuring image clarity.

For Embodiment 2, a hydrophilic treatment for the cover inner surface of the above-mentioned camera cover will be described.

For a camera cover according to this embodiment, a hydrophilic treatment is also performed on the cover inner surface.

Figure 14:
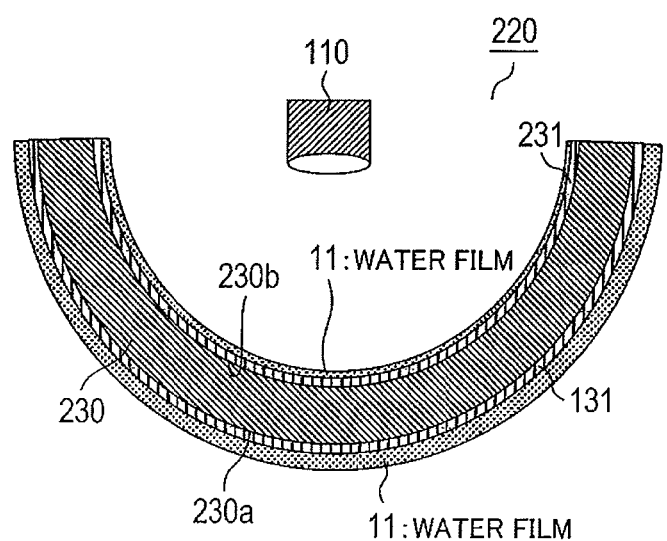
FIG. 14 is a sectional view of a key portion of a dome section of a camera cover according to Embodiment 2 of the claimed invention.

FIG. 14 is a sectional view of a key portion of a dome section of a camera cover according to Embodiment 2 of the claimed invention. In FIG. 14, like parts found in FIG. 1 and FIGS. 2A and 2B are given like reference numerals, while descriptions thereof are omitted.

As shown in FIG. 14, the surveillance camera includes camera section 110 (see FIGS. 2A and 2B), and camera cover 220, which houses and covers camera section 110, thus protecting camera section 110.

Camera cover 220 is a lens cover that covers a lens of camera section 110. In this embodiment, camera cover 220 covers the whole of camera section 110, and forms a main body housing of the surveillance camera. Camera cover 220 includes dome section 230 and camera body 140 (see FIG. 1). Dome section 230 covers the entire imaging surface of camera section 110. Camera body 140 supports and secures a circular opening of dome section 230.

Dome section 230 covers the entire imaging area of camera section 110 (see FIGS. 2A and 2B) housed in camera body 140. Because dome section 230 is dome-shaped, it has a broad field of view and is capable of significantly expanding the imaging range of camera section 110.

For dome section 230, a resin material with favorable moldability and transparency is used as a base material. The above-mentioned resin material includes organic resin materials and inorganic resin materials. In this embodiment, an organic resin material, such as polycarbonate and/or the like, is used for the base material of dome section 230. Polycarbonate is suitable because it is hard and resistant to impact. In addition, a resin with favorable transparency, such as acryl and/or the like, may also be used.

As shown in FIG. 14, a hydrophilic treatment is performed on outer surface 230a of dome section 230 to form hydrophilic coating (i.e., hydrophilically treated layer) 131. A hydrophilic treatment is performed on inner surface 230b to form hydrophilic coating (i.e., hydrophilically treated layer) 231.

Once hydrophilic coating 131 is formed, water drops that land on outer surface 230a do not become bead-shaped, and instead spread thinly across hydrophilic coating 131 and turn into a film, thus forming a water film.

In this embodiment, a hydrophilic treatment is performed on inner surface 230b of dome section 230.

[Hydrophilic Coating 231 on Inner Surface 230b of Dome Section 230]

As shown in FIG. 14, for camera cover 220, a hydrophilic treatment is performed on inner surface 230b to form hydrophilic coating (i.e., hydrophilically treated layer) 231. The main component of the material is a silicon compound. Silicon compounds, such as glass, are extremely durable and hard inorganic materials, and are also favorable in terms of light transmittance. Furthermore, silicon compounds exhibit hydrophilicity even in the absence of a photocatalyst including titanium dioxide. Therefore, silicon compounds provide permanent hydrophilic effects regardless of sunlight conditions. In this embodiment, a silicone material, which is a silicon compound, is used.

Hydrophilic coating 231 is so adapted that the contact angle for water drops on hydrophilic coating 231 is equal to or less than 10 degrees. With a contact angle of 10 degrees or greater, water vapor cannot be turned into a film. Specifically, because the water drop size of rain water and/or the like that adheres to the outer surface is approximately $\phi=2.0$ mm, neighboring rain drops merge readily, thus turning into a film. In contrast, the size of water vapor particles that adhere to the inner surface is approximately $\phi=0.02$ mm, and neighboring water vapor particles therefore do not merge very well. As these water vapor particles must spread very thinly before they can merge to form a film, the contact angle must be smaller than it is for the outer surface. However, because the inner surface does not require any self-cleaning functionality, there are no disadvantages to reducing the contact angle.

Figures 15, 16:
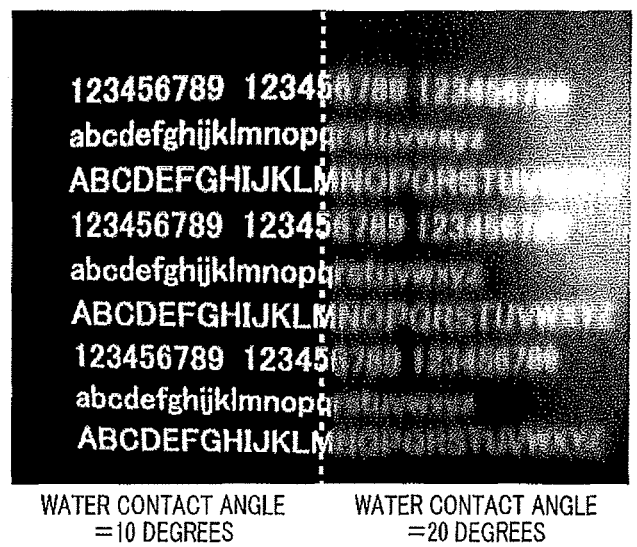
FIG. 15 shows a table representing the relationship between dome surface contact angle and image clarity per hydrophilic treatment with respect to the camera cover according to Embodiment 2 of the claimed invention.
FIG. 16 is a diagram comparing the visibility of images by a surveillance camera including the camera cover according to Embodiment 2 of the claimed invention.

FIG. 15 shows a table representing the relationship between dome surface contact angle (FIGS. 5A through 5E) and image clarity per hydrophilic treatment. The dome contact angles in the table shown in FIG. 15 were measured with water. As for image clarity, water was sprayed onto the dome surface and the image was evaluated. In FIG. 15, the circles represent evaluations where water drops were not recognized within the image and image clarity was favorable, and the crosses represent evaluations where water drops were recognized within the image and image clarity was poor.

As shown in FIG. 15, inner surface 230b of camera cover 220 includes hydrophilic coating 231 having a water contact angle of 10 degrees or less (treatment A, treatment B, treatment C).

FIG. 16 is a diagram comparing the visibility of surveillance camera images. FIG. 16 shows actual images of different dome surface contact angles. On the left side of the broken line in FIG. 16 is shown an actual image where the contact angle is 10 degrees. On the right side of the broken line in FIG. 16 is shown an actual image where the contact angle is 20 degrees.

As shown on the left side of the broken line in FIG. 16, when the contact angle is 10 degrees, the image is so clear that no water drops are recognizable at all within the image. On the other hand, as shown on the right side of the broken line in FIG. 16, when the contact angle is 20 degrees, water drops are recognized within the image, and a proper image is not obtained due to diffuse reflection by the water drops and varying refractive indices. Thus, a contact angle of 10 degrees is a turning point at which image clarity changes dramatically. Image clarity may be ensured by having the dome surface contact angle be 10 degrees or less.

Thus, because inner surface 230b of camera cover 220 includes hydrophilic coating 231 having a water contact angle of 10 degrees or less, a camera cover according to this embodiment is capable of preventing condensation (fogging due to water vapor) on the cover inner surface of the camera with the image made clear, that is, of preventing condensation caused by moisture within the cover space. In addition, there are beneficial effects in that it is cheaper, smaller, and simpler in configuration as compared to related art examples equipped with a small fan to prevent condensation inside the camera cover. In addition, if camera cover 220 includes both hydrophilic coatings 131 and 231 on outer surface 230a and inner surface 230b, respectively, the contact angle of hydrophilic coating 131 is greater than the contact angle of hydrophilic coating 231. Thus, at inner surface 230b, adverse effects on the image caused by fine water vapor particles or fogging may be prevented, while at outer surface 230a, adverse effects on the image caused by large water drops such as rain and/or the like may be prevented while also achieving self-cleaning functionality. Consequently, the benefits of hydrophilic coatings 131 and 231 may be obtained in a well-balanced manner.

It is to be understood that the descriptions above are merely illustrative of the presently preferred embodiments of the claimed invention, and that the scope of the claimed invention is by no means limited thereto.

For each of the embodiments above, the terms "camera cover" and "camera" have been used for purposes of convenience. However, the terms could also be "protective cover for camera," "surveillance camera," and/or the like.

Furthermore, the types of the various elements (for example, the resin base material) forming the above-mentioned camera covers and cameras, the hydrophilic coating method, and/or the like are by no means limited to those of the foregoing embodiments.

A camera cover and camera of the claimed invention are suitable for use as a camera cover for surveillance cameras used in surveillance systems and/or the like of outdoor facilities and buildings.

| Reference Signs List | |
|---|---|
| 100 | Surveillance camera |
| 110 | Camera section |
| 120 | Camera cover |
| 130 | Dome section |
| 130a | Outer surface |
| 131 | Hydrophilic coating |
| 140 | Camera body |

The invention claimed is:

1. A surveillance camera comprising:
   a housing;
   a cover, having a dome shape or a flat shape, having a light transmissive area including an inner surface and an outer surface, the inner surface and the outer surface each comprising a coating that imparts a water contact angle on the inner surface and the outer surface; the water contact angle of the outer surface is greater than the water contact angle of the inner surface; and the water contact angle of the outer surface is 5 to 30 degrees and the water contact angle of the inner surface is less than 10 degrees;
   a camera enclosed in at least one of the cover or the housing and configured to take an image through the light transmissive area; and
   a base member configured to secure the housing to an installation surface;
   wherein the light transmissive area includes an inner surface facing the camera and an outer surface opposite the inner surface; and
   the cover and the housing are secured together in a water-tight manner.

2. The surveillance camera according to claim 1, wherein the housing having a generally cylindrical portion extending from the base member and a transition portion extending from an end of the housing opposite the base member, the transition portion being secured to the cover.

3. The surveillance camera according to claim 2, wherein the transition portion has a tapered configuration.

4. The surveillance camera according to claim 2, wherein a plurality of depressions provided in the transition portion, each of the plurality of depressions being configured to receive a fastening member therein.

5. The surveillance camera according to claim 4, wherein each of the plurality of depressions being defined by a surface sloping inwardly from an outer surface of the transition portion.

6. The surveillance camera according to claim 5, wherein the transition portion having a tapered configuration, a taper of the transition portion being less than the inwardly slope of each of the plurality of depression.

7. The surveillance camera according to claim 5, wherein each of the plurality of depressions being positioned adjacent a boundary between the transition portion and the cylindrical portion.

8. The surveillance camera according to claim 1, wherein the coating of the outer surface comprises a self-cleaning functionality.

9. The surveillance camera according to claim 1, wherein the camera comprises a CCD.

10. The surveillance camera according to claim 1, wherein the camera has a cylindrical shape.

11. The surveillance camera according to claim 1, wherein the base member comprises a metal.

12. The surveillance camera according to claim 1, wherein the cover and the housing comprise a resin material.

13. The surveillance camera according to claim 1, wherein the coatings have a substantially even thickness.

14. The surveillance camera according to claim 1, wherein the outer surface is coated with the coating by spraying or dipping.

15. A cover for a camera, the cover, having a dome shape or a flat shape, having a light transmissive area including an inner surface and an outer surface, the inner surface and the outer surface each comprising a coating that imparts a water contact angle on the inner surface and the outer surface; the water contact angle of the outer surface is greater than the water contact angle of the inner surface; and the water contact angle of the outer surface is 5 to 30 degrees and the water contact angle of the inner surface is less than 10 degrees.

16. The cover according to claim 15, wherein the cover comprises a resin material.

17. The cover according to claim 16, wherein the coating of the outer surface comprises a self-cleaning functionality.

18. The cover according to claim 16, wherein the thickness of the coating of the outer surface is 0.01 to 1 µm; and maximum height Ry and ten-point average roughness Rz of the surface of the coating of the outer surface are 0.10 µm or less.

\* \* \* \* \*